(12) United States Patent
Lesecq

(10) Patent No.: US 7,001,126 B2
(45) Date of Patent: Feb. 21, 2006

(54) RIVET PROVIDED WITH ELASTIC FEET

(75) Inventor: Jean-Pierre Lesecq, Cormeilles en Parisis (FR)

(73) Assignee: I.T.W. De France, Beauchamp (FR)

( * ) Notice: Subject to any disclaimer, the term of this patent is extended or adjusted under 35 U.S.C. 154(b) by 19 days.

(21) Appl. No.: 10/673,196

(22) Filed: Sep. 30, 2003

(65) Prior Publication Data

US 2004/0071526 A1 Apr. 15, 2004

(30) Foreign Application Priority Data

Oct. 11, 2002 (FR) ................................. 02 12669

(51) Int. Cl.
 *F16B 21/00* (2006.01)
(52) U.S. Cl. ..................................... 411/340; 411/345
(58) Field of Classification Search ........ 411/508–510, 411/913, 340, 344–346; 24/297, 453
 See application file for complete search history.

(56) References Cited

U.S. PATENT DOCUMENTS

| | | | | |
|---|---|---|---|---|
| 3,532,024 A | * | 10/1970 | Gutshall ..................... | 411/38 |
| 3,878,760 A | | 4/1975 | Jeal et al. | |
| 4,075,924 A | * | 2/1978 | McSherry et al. .......... | 411/112 |
| 4,080,522 A | * | 3/1978 | Schimmels ................. | 200/295 |
| 4,215,545 A | * | 8/1980 | Morello et al. ............... | 60/413 |
| 4,286,497 A | * | 9/1981 | Shamah ...................... | 411/342 |
| 4,306,824 A | | 12/1981 | Tanaka et al. | |
| 4,377,358 A | * | 3/1983 | Wollar ......................... | 411/15 |
| 4,530,630 A | * | 7/1985 | Brown ........................ | 411/340 |
| 4,657,461 A | * | 4/1987 | Smith ......................... | 411/340 |
| 4,865,501 A | * | 9/1989 | Ferris ......................... | 411/340 |
| 4,943,253 A | * | 7/1990 | Smith ......................... | 411/342 |
| 5,350,481 A | * | 9/1994 | Shepard et al. ............. | 156/423 |
| 5,370,646 A | * | 12/1994 | Reese et al. .................. | 606/72 |

FOREIGN PATENT DOCUMENTS

GB        2 034 849        6/1980

* cited by examiner

*Primary Examiner*—Flemming Saether
(74) *Attorney, Agent, or Firm*—Lowe Hauptman & Berner, LLP

(57) ABSTRACT

A rivet (1) includes a bearing head (2), a pulling stem (3) and an insertion body (4). The insertion body (4) includes at least two longitudinal flat surfaces (13) interrupting a notched portion (14); and at least two elastic feet (15) each having a first end elastically joined to the insertion body (4) and a second end which is free. Each of these elastic feet (15) is adapted to adopt a folded position in which it is folded along the insertion body (4), on one of the flat surfaces (13), and a tightened position in which it is arranged transversely of the general orientation of the insertion body (4). The bearing head (2) has at least one slot (9) enabling the head to deform radially.

20 Claims, 2 Drawing Sheets

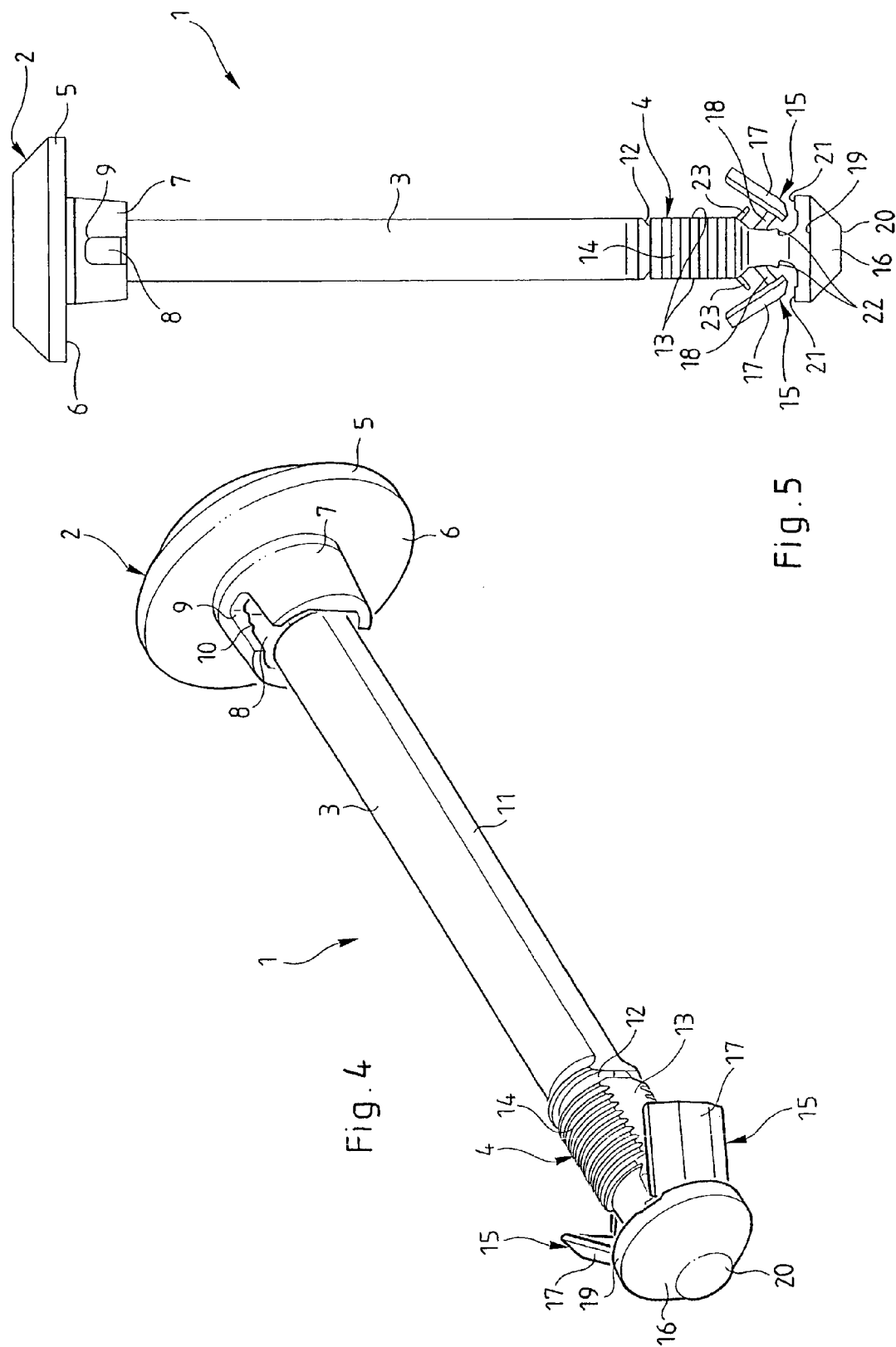

RIVET PROVIDED WITH ELASTIC FEET

FIELD OF THE INVENTION

The invention relates to the assembly of parts by tightening through an opening passing through the parts, and more particularly to a rivet comprising a bearing head and a pulling stem.

BACKGROUND OF THE INVENTION

Rivets are common components, of elongate form, making it possible to assemble for example two sheets of metal one against the other. The rivet is inserted into a hole pierced in the assembly of the two sheets of metal to make it possible to achieve "blind" assembly, that is to say solely by manipulations on the projecting part of the rivet, most often by pulling on the stem.

Common rivets are metallic and comprises a pulling stem of steel provided at one of its ends with a head, and also comprising a sleeve of aluminum also provided with a head, the sleeve being joined to the pulling stem such that said heads are spaced apart from each other.

This type of rivet is inserted, by the head of the pulling stem, into a hole passing through an assembly, that head projecting from the other side of the assembly, and then the pulling stem is pulled with respect to the head of the sleeve, which bears on the assembly, until the head of the stem deforms the body of the sleeve while tightening the members of the assembly against each other, between the head of the sleeve and the body of the deformed sleeve.

Other known rivets are in plastics material, which for example avoids them having to be removed from parts made of plastics material destined to be recycled.

These plastics rivets have the same form as corresponding rivets in steel-aluminum with the sole difference being that the sleeve generally comprises a tooth adapted to cooperate with notched portion on the pulling stem, close to the head, in order to maintain the tightened position after the stem has been pulled.

Although these known rivets are satisfactory in the performance of their function, they require to be manufactured from two different types of material on account of the different properties necessitated for the pulling stem (hardness, low plastic deformation, etc.) and for the sleeve (ductility, considerable plastic deformation, etc.).

SUMMARY OF THE INVENTION

The object of the invention is to improve existing plastics rivets, in particular by enabling easier and cheaper manufacture.

To that end, the invention relates to a rivet comprising:
  a bearing head in which an opening is provided;
  a pulling stem adapted to cooperate in sliding relationship with the bearing head, through said opening;
  an insertion body connected to a first end of the pulling stem and comprising, continuing on from the pulling stem, a notched portion;

the bearing head further comprising, on the inner faces of the opening, at least one tooth adapted to cooperate with said notched portion;

said rivet being characterized in that the insertion body comprises
  at least two longitudinal flat surfaces interrupting said notched portion;
  at least two elastic feet each comprising a first end elastically joined to the insertion body and a second end which is free, each of these elastic feet being adapted to adopt a folded position in which it is folded along the insertion body, on one of said flat surfaces, and a tightened position in which it is arranged transversely of the general orientation of the insertion body;

and in that the bearing head comprises at least one slot enabling it to deform radially.

Such a rivet possesses a homogeneous structure in terms of mechanical properties of the materials used.

Thus, firstly, the bearing head does not require to be manufactured from a highly elastically deformable material (to enable its deformation during ratcheting of the tooth on the notched portion) since the slots promote its radial deformation. Secondly, since the tightening function is no longer ensured by the deformation of a sleeve but by the movement of elastic feet, the rivet may include as one piece the pulling stem and the elastic feet since a hard material (necessary for the pulling stem) permitting slight elastic deformation (necessary for the elastic feet) can suffice for the production of that pulling stem continuing on from the insertion body.

None of the parts of the rivet is thus plastically deformed on tightening and materials with similar mechanical properties can thus be used to produce the pulling stem, the insertion body, and the bearing head.

Moreover, it is possible to produce the rivet using a single material.

The operations of manufacture and assembly are thus considerably simplified, it being possible to mold the two parts of the rivet in a single operation, in the same mold, by introducing material only once.

According to one embodiment, each of the elastic feet is additionally adapted to adopt a free position, between the folded position and the tightened position, the elastic foot spontaneously adopting this free position without being urged, in which its free end projects from the insertion body, the elastic foot being orientated substantially at 45° with respect to the general orientation of the insertion body, its free end being closer to the pulling stem than its joined end.

This position adopted by the elastic feet at rest enables them to have a non-return function. Thus the insertion body may be introduced into a through aperture, the elastic feet moving into folded position on contact with the inner walls of the aperture, but cannot be extracted since the elastic feet, freed on exiting from the other side of the aperture, move into tightened position in case the stem is pulled.

To increase this effect, the insertion body may further comprise a return foot, projecting from the insertion body towards one of the elastic feet, said return foot being adapted to exert a force tending to push back the corresponding elastic foot to its free position, when the latter is in its folded position.

According to another embodiment, the pulling stem comprises at least two longitudinal flat surfaces joined together by other surfaces, each of these flat surfaces being positioned to continue on from one of said flat surfaces of the insertion body, and in that said opening provided in the bearing head comprises longitudinal flat surfaces, of the same profile as the flat surfaces of the pulling stem, adapted to cooperate with said flat surfaces of the pulling stem to prevent the bearing head from rotating with respect to the pulling stem.

These flat surfaces avoid having to angularly position the bearing head with respect to the insertion body, during tightening of the rivet, such that the tooth of the insertion head is located in register with the notched portion.

The alignment of the flat surfaces of the insertion body with the flat surfaces of the pulling stem enables the bearing head to be positioned angularly from the time of its being mounted on the pulling stem, and to maintain that angular position along the length of its travel on the pulling stem and the insertion body.

Moreover, the flat surfaces of the opening provided in the bearing head, and said slot in the bearing head may be angularly offset.

This makes it possible to position the slots in the bearing head on the notched portion of the insertion body, on tightening of the rivet.

Furthermore, the bearing head may comprise a collar having a bearing surface substantially perpendicular to the pulling stem, as well as an annulus projecting substantially perpendicular to said bearing surface, said opening passing completely though the collar and being coaxial with the annulus.

Said slot and said tooth of the bearing head may furthermore be provided on said annulus.

This is a preferred construction for the bearing head to fulfill its functions optimally: the collar bears on the surface surrounding the aperture in which the insertion body is introduced, whereas the projecting annulus penetrates into the hole with the pulling stem, the bearing head thus providing a transversal bearing and a longitudinal surface for the work of the slot.

To ensure the stability of the tightened position of the elastic feet, the insertion body may comprise at least one stop surface arranged transversally to the general orientation of the insertion body and adapted to form an abutment for the elastic feet when they are in the tightened position.

Similarly, the insertion body may further comprise at least one blocking surface provided transversally to the general orientation of the insertion body, facing said stop surface and spaced from it by a distance substantially equal to the thickness of said elastic feet, said blocking surface being adapted to form a counter abutment for the elastic feet when they are in the tightened position.

According to one embodiment, the connection of the pulling stem and the insertion body is made by a weakened zone which is narrower than the pulling stem.

At the end of the tightening of the rivet, this weakened zone is adapted to rupture in order to separate the pulling stem from the insertion body, the assembly formed by the insertion body onto which the bearing head is ratcheted remaining fixed onto the parts to be assembled.

The insertion body may further comprise, at its end opposite the pulling stem, an insertion head flaring out from a small end to a large end, the small end being furthest from the pulling stem and the large end being adapted such that the elastic feet, when they are in the folded position, are totally retracted with respect to the outline of the large end.

Such a rivet has at its end a chamfer facilitating its introduction into an aperture.

Furthermore, the maximum transverse diameter of the large end determines the minimum diameter for piercing the aperture adapted to receive the rivet.

BRIEF DESCRIPTION OF THE DRAWINGS

Other features and advantages of the invention will appear in the light of the following description of a preferred embodiment, given by way of non-limiting example, and made with reference to the accompanying drawings in which.

Figure 1:
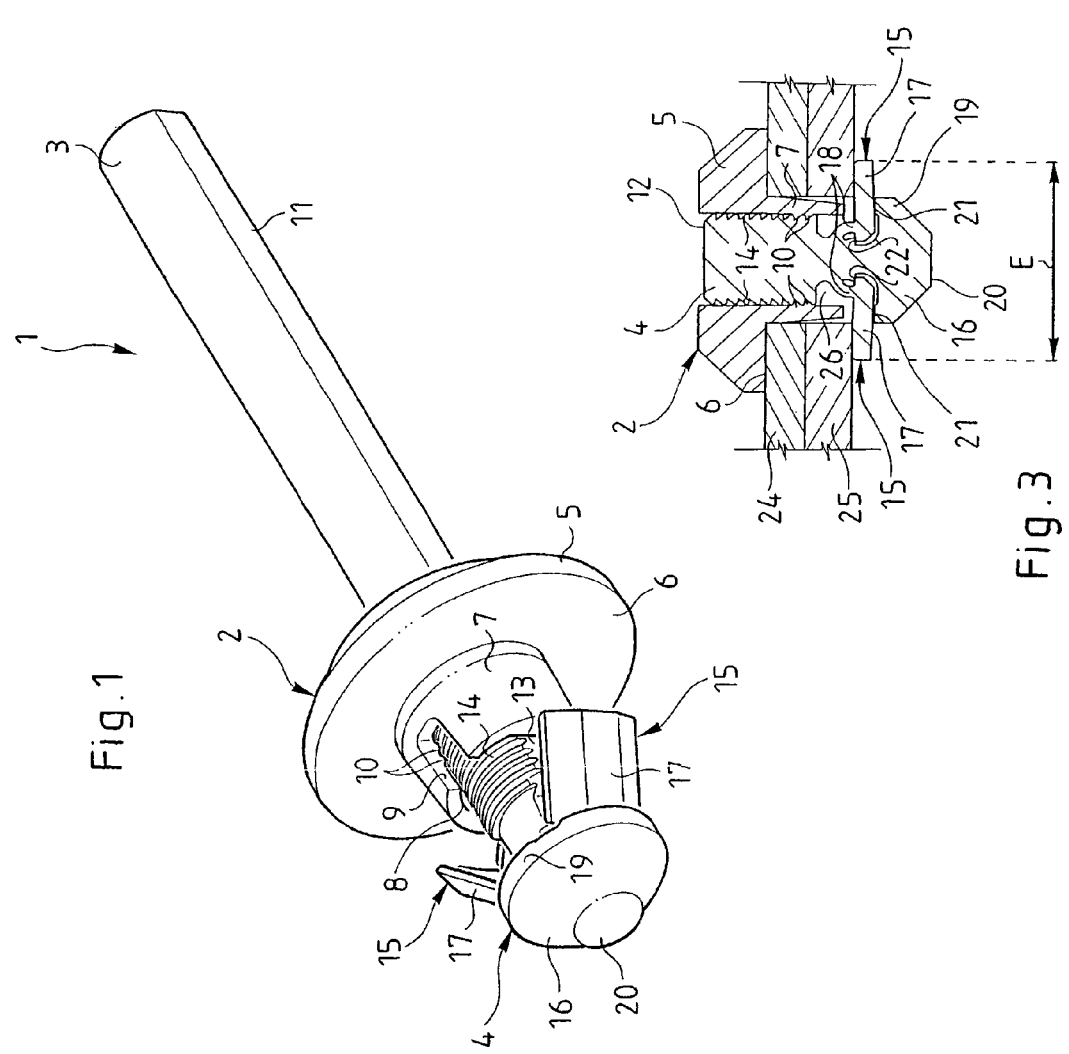
FIG. 1 is a perspective view of a rivet according to the invention, the bearing head being engaged on the notched portion.
Figure 2:
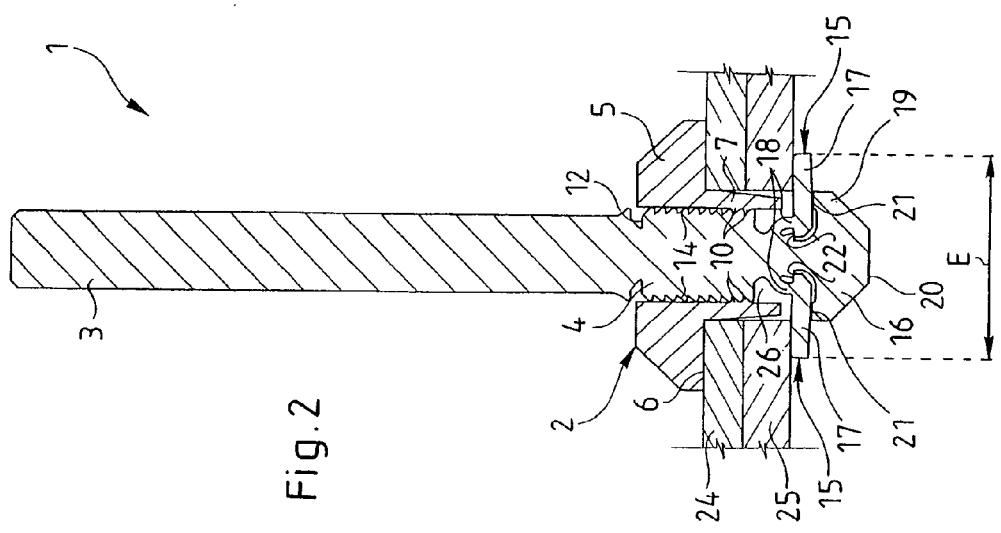
FIG. 2 is a longitudinal cross-section of the rivet of FIG. 1, the rivet clamping two sheets of metal against each other, this cross-section being arranged angularly such that a side view of the elastic feet as well as the notched portion both appear on the same drawing.

Feature 3 is a similar view to that of FIG. 2, the pulling stem having been removed;

FIG. 4 is a perspective view of the rivet of FIG. 1, the bearing head being disposed at one end of the pulling stem;

FIG. 5 is a plan view of the rivet of FIG. 4.

DETAILED DESCRIPTION OF THE PREFERRED EMBODIMENTS

FIG. 1 represents a rivet 1 in perspective comprising a bearing head 2 as well as an assembly formed by a pulling stem 3 connected to a insertion body 4, the pulling stem 3 and the insertion body 4 each being a continuation of the other.

The bearing head 2, also visible from the side in FIG. 4, comprises a circular collar 5 having a transverse bearing surface 6 as well as a frusto-conical annulus 7 projecting perpendicularly from the bearing surface 6 and being coaxial with it, the portion of largest diameter of the frusto-conical annulus 7 being adjacent to the bearing surface 6.

An opening 8 passes completely through the bearing head 2, perpendicularly and coaxially to the collar 5 and to the annulus 7.

This opening has a cross-section formed by two mutually parallel rectilinear segments, joined by two arcs of a circle, this opening being the complementary form of a cylinder which would have two diametrically opposed flat surfaces.

The bearing head 2 furthermore comprise two slots 9 made through the full thickness of the annulus 7 and opening at its end opposite to the collar 5.

These slots 9 are diametrically opposite along a diameter of the annulus 7 perpendicular to the diameter having the flat surfaces of the opening 8, each slot 9 thus being angularly offset by 90° with respect to each flat surface of the opening 8.

Finally, the bearing head 2 comprises two teeth 10 of substantially triangular section projecting from the inner faces of the annulus 7 which extend along the curved surfaces of the opening 8 and are interrupted by the slots 9 and the flat surfaces of the opening 8.

Apart from this bearing head 2, the rivet is formed from an elongate part made up of the pulling stem 3 connected to an insertion body 4.

The pulling stem 3 is generally cylindrical although it comprises two longitudinal flat surfaces 11 which are diametrically opposed.

This pulling stem 3 is connected by one of its ends to the insertion body 4, via a weakened zone 12 of smaller diameter than the pulling stem 3.

The insertion body 4 extends from that weakened zone 12, as a continuation from the pulling stem 3. It comprises two diametrically opposite flat longitudinal surfaces 13, similar to the flat surfaces 11 of the pulling stem and disposed adjacent to them.

The two flat surfaces 13 of the insertion body 4 are connected by two curved surfaces 14 bearing transversal notches, these notches being of triangular section adapted to cooperate with the teeth 10 borne by the bearing head 2 for the purposes of longitudinal blocking.

Continuing on from that notched portion 14, there are arranged two elastic feet 15 and then an insertion head 16.

The elastic feet 15 are each formed from a bearing wall 17 of curved form as well as from an elastically deformable tab 18 linking the bearing wall 17 to the insertion body 4 such that the bearing wall 17 is mobile due to the elastic deformation of the tab 18.

The insertion head 16 is adjacent to the elastic feet 15 and forms the end of the insertion body 4.

This insertion head 16 is frusto-conical, its base 19 of larger diameter being on the side of the insertion body 4 and its base 20 of smaller diameter constituting the end of the insertion body 4, so as to form a chamfer facilitating the introduction of the rivet 1 by its insertion head 16 into an adapted aperture (that is to say of diameter greater than the greatest diameter 19 of the insertion head 16).

The insertion head 16 further comprises, for the purpose of its cooperation with the elastic feet 15, two diametrically opposite stop surfaces 21 each facing one of said elastic feet 15.

Similarly, two transverse blocking surfaces 22 are provided on the insertion head 16, which are diametrically opposite and each facing one of the elastic feet 15 while being opposite the stop surfaces 21.

The separation between a stop surface 21 and the corresponding blocking surface 22 corresponds substantially to the thickness of the walls 17 of the elastic feet 15.

This is because, by the possible movement of the elastic tabs 18, the elastic feet 15 may adopt two extreme positions: a folded position and a tightened position, with, between these two positions, a free position.

The free position corresponds to the undeformed position of the tabs 18, that is to say that this position is adopted spontaneously by the elastic foot 15, in the absence of exterior forces. This is the position of the elastic feet 15 as represented in FIGS. 1, 4 and 5: the free end of the foot 15 projects and the wall 17 is oriented at 45° to the general orientation of the insertion body.

In the folded position, the elastic tabs 18 are deformed such that the walls 17 are folded against the flat surfaces 13 of the insertion body 4, the elastic feet 15 then being entirely retracted with respect to the largest diameter 19 of the insertion head 16. The insertion body comprises two return feet 23 projecting towards the elastic feet 15 and facing them, these return feet 23 being adapted to exert a force tending to push back each elastic foot 15 towards its free position, when it is in the folded position.

Figure 3:
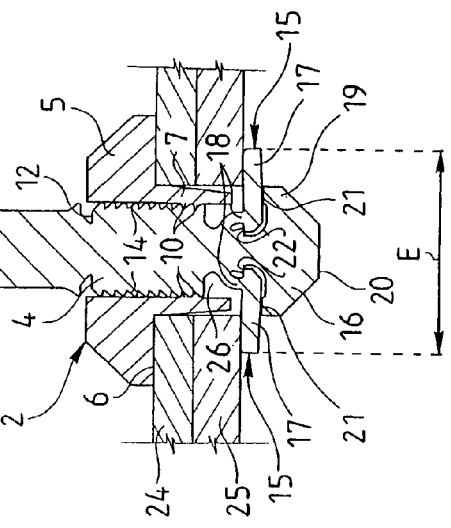

In the tightened position, the elastic tabs 18 are deformable such that the walls 17 are brought into abutment against the stop surfaces 21 and into opposite abutment against the blocking surfaces 22, as shown in FIGS. 2 and 3.

The rivet which has just been described may be manufactured and used in the following manner.

For manufacture, a conventional mold is used which is adapted to form the unit comprising pulling stem 3 plus insertion body 4.

The mold comprises in addition a cavity adapted to form the bearing head 2 disposed at the end of the cavity adapted to form the pulling stem 3, to obtain a rivet in a single piece, as in FIGS. 4 and 5. The mold is provided such that the linking webs of the bearing head 2 and the pulling stem 3 are of small thickness, in comparison with the other thicknesses of the rivet, and, moreover, an insert is arranged in the mold to form the internal opening of the bearing head.

Molding is then carried out by a single injection of polymer and, on extraction from the mold, said insert is removed by virtue of the elasticity of the bearing head 2 permitting sufficient deformation to extract the teeth 10 formed by that insert.

The item of FIGS. 4 and 5 is thus obtained in the mold which is a rivet 1 of which the bearing head 2 is attached to the pulling stem 3 by a fine frangible zone.

The mold is furthermore provided with an ejection device adapted to slip the bearing head 2 onto the pulling stem 3, causing the rupture of said frangible zone to produce the rivet of FIG. 1. For this, the head 2 is slipped along the pulling stem 3, the profile of the opening 8 and the flat surfaces 11 cooperating to ensure the longitudinal sliding and to prevent the rotation of the bearing head 2 with respect to the pulling stem 3.

This sliding results in the engagement of the bearing head 2 on the notched portion 14 of the insertion body 4 and, consequently, in the ratcheting of the teeth 10 of the head 2 on the notches.

The rivet is finally ejected from the mold and ready to use.

The user having to assemble parts, such as two sheets of metal 24, 25 as shown in FIGS. 2 and 3, with such a rivet, first of all provides a hole 26 passing completely through the two sheets of metal 24, 25.

This hole 26 must have a diameter greater than the greatest diameter 19 of the insertion head 16 and less than the span E (FIG. 2) of the elastic feet 15 in the tightened position.

The rivet 1 is introduced into this hole 26 by the insertion head 16. On entry of the insertion body 4, the elastic feet 15 being in their free position, the walls 17 come into contact with the edges of the hole 26 and the movement of introduction of the rivet causes folding of the elastic feet 15 into the folded position, while the hole 26 is passed through.

Once the insertion body 4 emerges from the other side of the hole 26, the elastic feet 15 immediately return to their free position, while the bearing surface 6 of the bearing head comes into contact with one of the sheets of metal.

The ratcheting of the teeth 10 on the notches continues as far as is enabled by the thickness of the parts 24, 25 to be assembled (FIG. 2) and is carried out with the use of conventional riveting pliers capable of pulling on the pulling stem 3 relative to the bearing head 2.

When the two parts 24, 25 have been tightened as much as possible, continued pulling on the stem 3 gives rise to its rupture, at the weakened zone 12, so giving the final disposition of the items in FIG. 3.

The invention claimed is:

1. A rivet, comprising:
   a nut having a through opening;
   a stem passable through the opening of said nut which is slidable along said stem, said stem having upper and lower ends and a notched portion located between said upper and lower ends;
   a head at the upper end of said stem;
   said nut further comprising, on an inner face of the opening, at least one tooth engageable with said notched portion; and
   a locking element elastically moveable between a folded position and a locked position, wherein said locking element has a greater radial extent in the locked position than in the folded position;
   wherein said locking element comprises:
   a first section being elastically deformable and having a proximal end joined to said stem at a first location, and a distal end, wherein said locking element further has, between the folded and locked positions, a relaxed position in which said first section extends obliquely upwardly towards said head; and
   a second section having a proximal end and a distal end and a middle portion therebetween, said second section being joined to the distal end of said first section at said middle portion, wherein, in the relaxed position, said second section extends obliquely downwardly away from said head; and said stem further comprises, at a second location closer to said head than said first location, a flange facing, in an axial direction of said stem, towards said head, said flange defining a blocking surface on which a lower surface of the proximal end of said second section rests in the locked position.

2. The rivet of claim 1, wherein said opening extends circumferentially for a full 360 degrees in at least a portion of said nut and less than 360 degrees in a remaining portion of said nut where a circumferential wall of said opening is interrupted by at least one slot enabling said opening to be radially expansible in the remaining portion of said nut.

3. The rivet of claim 2, wherein the inner face of the circumferential wall of said opening in the remaining portion of said nut carries said at least one tooth.

4. The rivet of claim 2, wherein the circumferential wall of said opening in the remaining portion of said nut is interrupted by two said slots and comprises two radially expansible legs located circumferentially between said slots, said at least one tooth being provided on the inner face of at least one of said legs.

5. The rivet of claim 4, wherein the inner face of each of said legs includes a flat section free of said at least one tooth and two curved sections on opposite sides of said flat section, each of said curved sections being located between the flat section and one of said two slots and carrying at least one said tooth.

6. The rivet of claim 4, wherein said nut in a region of said slots has a frusto-conical outer surface converging toward said head.

7. The rivet of claim 4, wherein the inner face of each of said legs includes at least a curved section carrying said at least one tooth and a flat section free of said at least one tooth;

said stem comprising on an outer surface thereof two flat sections corresponding to the flat sections of said two legs of said nut, respectively.

8. The rivet of claim 7, wherein the outer surface of said stem further comprises two curved sections located circumferentially between the flat sections of the outer surface of said stem;

the flats sections of the outer surface of said stem extend longitudinally into the notched portion of said stem; and the curved sections of the outer surface of said stem in the notched portion include a plurality of teeth engageable with said at least one tooth of said nut.

9. The rivet of claim 8, being entirely made of a single material.

10. The rivet of claim 1, further comprising a return foot extending from said stem, at a second location further from said head than said first location, towards said head, said return foot being elastically compressible by said locking element when said locking element is in the folded position to bias said locking element into the expanded position.

11. The rivet of claim 10, wherein said return foot, said stem, said head and said locking element are all made integrally from the same material.

12. The rivet of claim 1, wherein said second section is connected to said stem exclusively via said first section without being directly attached to said stem or said head.

13. The rivet of claim 1, wherein said stem is a solid stem; and wherein said opening, said head and said solid stem are coaxially arranged.

14. The rivet of claim 13, wherein said solid stem and said opening have matching cross sections each comprising two convexly curved sections connected by two flat sections.

15. The rivet of claim 1, wherein said head has, on a underside thereof, a stop surface facing, in the axial direction of said stem, towards the lower end of said stem; and said distal end of said second section has an upper surface which, in the locked position, rests on said stop surface.

16. The rivet of claim 15, wherein said blocking and stop surfaces are substantially parallel and spaced, in the axial direction of said stem, from one another by a distance substantially equal to a thickness of said second section.

17. The rivet of claim 15, wherein the underside of said head and said flange are connected by a radially inwardly curved outer surface of said stem, said radially inwardly curved outer surface defining a cavity into which the proximal end of said second section is partially received in the locked position.

18. A rivet, comprising:

a nut having a through opening;

a stem passable through the opening of said nut which is slidable along said stem without being rotatable about said stem, said stem having opposite upper and lower ends and a notched portion between said upper and lower ends;

a head at the upper end of said stem;

said nut further comprising, on an inner face of the opening, at least one tooth engageable with said notched portion; and a locking element joined to said stem adjacent said head, said locking element being elastically moveable between a folded position and an expanded position, wherein said locking element has a greater radial extent in the expanded position than in the folded position;

wherein said opening extends circumferentially for a full 360 degrees in at least a portion of said nut, and said locking element further has a locked position in which said locking element has a greater radial extend than in the expanded position;

said locking element being elastically joined to said stem at a first location adjacent said head;

said stem further comprising, at a second location closer to said head than said first location, a reduced cross section portion defining a flange facing, in an axial direction of said stem, towards said head, said flange defining a blocking surface on which a lower surface of said locking element rests in the locked position.

19. The rivet of claim 18, wherein said head has, on a underside thereof, a stop surface facing, in the axial direction of said stem, towards the lower end of said stem; and said locking element further has an opposite, upper surface which, in the locked position, rests on said stop surface.

20. The rivet of claim 19, wherein said blocking and stop surfaces are substantially parallel and spaced from one another by a distance substantially equal to a thickness of said locking element defined between said opposite surfaces of the locking element.

* * * * *